US012554976B2

(12) United States Patent
Atallah et al.

(10) Patent No.: US 12,554,976 B2
(45) Date of Patent: Feb. 17, 2026

(54) HYBRID COMPUTE-IN-MEMORY

(71) Applicant: QUALCOMM Incorporated, San Diego, CA (US)

(72) Inventors: Francois Ibrahim Atallah, Raleigh, NC (US); Hoan Huu Nguyen, Cary, NC (US); Colin Beaton Verrilli, Apex, NC (US); Natarajan Vaidhyanathan, Carrboro, NC (US)

(73) Assignee: QUALCOMM INCORPORATED, San Diego, CA (US)

( * ) Notice: Subject to any disclaimer, the term of this patent is extended or adjusted under 35 U.S.C. 154(b) by 1196 days.

(21) Appl. No.: 17/472,412

(22) Filed: Sep. 10, 2021

(65) Prior Publication Data

US 2023/0078079 A1 Mar. 16, 2023

(51) Int. Cl.
*G06N 3/065* (2023.01)
*G11C 11/412* (2006.01)
*H03M 1/12* (2006.01)

(52) U.S. Cl.
CPC ............ *G06N 3/065* (2023.01); *G11C 11/412* (2013.01); *H03M 1/12* (2013.01)

(58) Field of Classification Search
CPC ...... G06N 3/065; G06N 3/0464; G06N 3/048; G11C 11/412; G11C 7/227; G11C 11/54; G11C 7/1006; H03M 1/12; Y02D 10/00
See application file for complete search history.

(56) References Cited

U.S. PATENT DOCUMENTS

| 5,903,492 | A  | 5/1999 | Takashima |
| 6,421,265 | B1 | 7/2002 | Lien et al. |
| 7,010,419 | B2 | 3/2006 | Abe et al. |
| 8,130,582 | B2 | 3/2012 | Shimano et al. |
| 8,185,851 | B2 | 5/2012 | Kengeri et al. |
| 8,631,365 | B2 | 1/2014 | Kengeri et al. |
| 9,666,286 | B2 | 5/2017 | Lee |
| 10,249,362 | B2 | 4/2019 | Shu et al. |
| 10,725,777 | B2 | 7/2020 | Shu et al. |

(Continued)

FOREIGN PATENT DOCUMENTS

| CN | 102623044 A | 8/2012 |
| CN | 105957552 A | 9/2016 |

(Continued)

OTHER PUBLICATIONS

Chen Z., et al., "CAP-RAM: A Charge-Domain In-Memory Computing 6T-SRAM for Accurate and Precision-Programmable CNN Inference", IEEE Journal of Solid-State Circuits, IEEE, USA, vol. 56, No. 6, May 26, 2021, pp. 1924-1935, XP011856845, ISSN: 0018-9200, DOI: 10.1109/JSSC.2021.3056447, [retrieved on May 25, 2021], p. 1924-p. 1934, figures 1-19.

(Continued)

*Primary Examiner* — Alexander Sofocleous
*Assistant Examiner* — James S Wells
(74) *Attorney, Agent, or Firm* — Loza & Loza, LLP

(57) ABSTRACT

A compute-in-memory array is provided that implements a filter for a layer in a neural network. The filter multiplies a plurality of activation bits by a plurality of filter weight bits for each channel in a plurality of channels through a charge accumulation from a plurality of capacitors. The accumulated charge is digitized to provide the output of the filter.

14 Claims, 9 Drawing Sheets

(56) References Cited

U.S. PATENT DOCUMENTS

| | | | |
|---|---|---|---|
| 10,964,380 B1* | 3/2021 | Wang | .................. G11C 8/16 |
| 2005/0226079 A1 | 10/2005 | Zhu et al. | |
| 2019/0042199 A1 | 2/2019 | Sumbul et al. | |
| 2019/0080231 A1 | 3/2019 | Nestler et al. | |
| 2019/0164616 A1 | 5/2019 | Nguyen et al. | |
| 2019/0370640 A1 | 12/2019 | Peng et al. | |
| 2020/0243154 A1 | 7/2020 | Sity et al. | |
| 2021/0041928 A1 | 2/2021 | Eberlein | |
| 2021/0271597 A1* | 9/2021 | Verma | ................ G06F 12/0607 |

FOREIGN PATENT DOCUMENTS

| | | |
|---|---|---|
| CN | 108122574 A | 6/2018 |
| CN | 110291587 A | 9/2019 |
| TW | I579847 B | 4/2017 |
| WO | 2021158341 A1 | 8/2021 |

OTHER PUBLICATIONS

International Search Report and Written Opinion—PCT/US2022/039731—ISA/EPO—Dec. 9, 2022.

Khaddam-Aljameh R., et al., "An SRAM-Based Multibit In-Memory Matrix-Vector Multiplier with a Precision That Scales Linearly in Area, Time, and Power", IEEE Transactions on Very Large Scale Integration Systems, IEEE Service Center, Piscataway, NJ, USA, vol. 29, No. 2, Dec. 9, 2020, pp. 372-385, XP011835114, ISSN: 1063-8210, DOI: 10.1109/TVLSI.2020.3037871 [retrieved on Jan. 26, 2021], pp. 372-385, figures 1-11.

Si X., et al., "15.5 A 28nm 64Kb 6T SRAM Computing-in-Memory Macro with 8b MAC Operation for AI Edge Chips", ISSCC 2020 / Session 15 / SRAM & Compute-In-Memory / 15.5, 2020 IEEE International Solid-State Circuits Conference, Feb. 18, 2020, 3 Pages.

* cited by examiner

HYBRID COMPUTE-IN-MEMORY

TECHNICAL FIELD

This application relates to compute-in-memories, and more particularly to a hybrid compute-in-memory.

BACKGROUND

Digital processing of data typically uses a Von Neumann architecture in which the data is retrieved from a memory to be processed in an arithmetic and logic unit (ALU). In computation-intensive applications such as machine learning, the data flow from and to the memory may become a bottleneck for processing speed. Compute-in-memory architectures have been developed in which the data processing hardware is distributed across the bitcells. As compared to traditional digital computers, compute-in-memories may have reduced power consumption in that the data does not need to be transported to a processing unit. In addition, compute-in-memories reduce power consumption because compute-in-memories perform multiplication and summation operations in the analog domain such as by accumulating charge from a plurality of capacitors.

Despite the power savings, compute-in-memories typically require an analog-to-digital converter (ADC) to convert the voltage resulting from the accumulated charge into a digital value. To minimize the ADC power consumption, it is conventional to utilize a successive-approximation or slope ADC, but this slows operating speed. To have the same precision as traditional digital computing, a high-resolution ADC is desirable but then operating speed may again be reduced and power consumption increased. For edge and server machine learning applications needing trillions of operations per second, it is thus conventional to use a traditional digital architecture at the cost of increased power consumption as compared to a compute-in-memory computation.

SUMMARY

In accordance with an aspect of the disclosure, a compute-in-memory is provided that includes: a plurality of first switch pairs corresponding to a plurality of first bits, each first switch pair including a first switch controlled by a corresponding first bit from the plurality of first bits and including a second switch controlled by a second bit; a plurality of first capacitors corresponding to the plurality of first switch pairs, each first capacitor being coupled in series with a corresponding first switch pair from the plurality of first switch pairs; a first compute line coupled to the plurality of first capacitors; and a first analog-to-digital converter having an input terminal coupled to the first compute line.

In accordance with another aspect of the disclosure, a method of operation for a compute-in-memory is provided that includes: charging a first compute line responsive to a first multiply-and-accumulate operation between a first filter weight bit and a first plurality of activation bits for a first plurality of channels; digitizing a voltage of the first compute line to provide a first digital number; charging a second compute line responsive to a second multiply-and-accumulate operation between a second filter weight bit and a second plurality of activations bits for a second plurality of channels; digitizing a voltage of the second compute line to provide a second digital number; and adding the first digital number and the second digital number to provide a sum.

In accordance with yet another aspect of the disclosure, a compute-in-memory is provided that includes: a first plurality of arithmetic cells, each arithmetic cell in the first plurality of arithmetic cells including a first capacitor; a first plurality of switches; a first compute line coupled to each first capacitor in the first plurality of arithmetic cells through the first plurality of switches; and a first analog-to-digital converter having an input terminal coupled to the first compute line.

These and other advantageous features may be better appreciated through the following detailed description.

BRIEF DESCRIPTION OF THE DRAWINGS

Aspects of the present disclosure and their advantages are best understood by referring to the detailed description that follows. It should be appreciated that like reference numerals are used to identify like elements illustrated in one or more of the figures.

DETAILED DESCRIPTION

Figure 1:
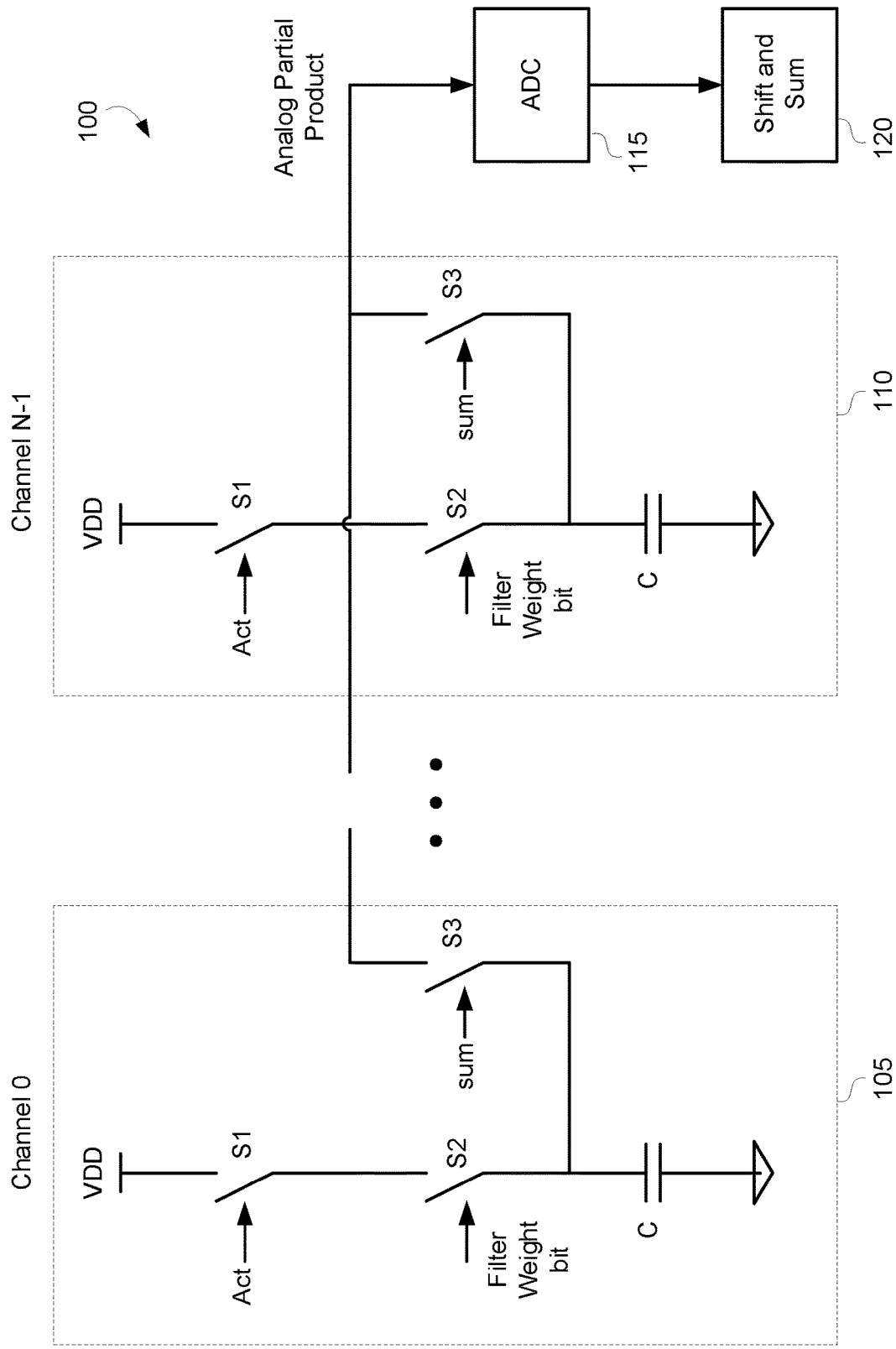
FIG. 1 illustrates a hybrid compute-in-memory including an arithmetic cell array, an analog-to-digital converter, and a digital adder in accordance with an aspect of the disclosure.

A hybrid compute-in-memory architecture is provided that combines the speed of traditional digital computing with the power savings of compute-in-memory computation. To provide a better appreciation of these advantageous features, some background concepts in neural networks will first be discussed. The data processing in a convolutional neural network (CNN) or a deep neural network (DNN) begins with the input data. For example, the input data may be pixels of a color image or digital voice samples and so on. The following discussion will assume the input data is color image data and that the neural network is a convolutional neural network without loss of generality. To support a color image, each pixel may have a red component, a green component, and a blue component. Each color component for a given image may be deemed to form a channel for the CNN computation. Other colors in the image such as magenta may also form a channel. Note that non-color components such as image intensity may also form their own channel.

Each stage in a CNN computation may be designated as a layer. The input data is thus processed in an input layer. The output of a given layer is then processed by a succeeding layer until a final output layer is reached. If there are just red, green, and blue components in the input data, an initial layer for the CNN may thus have only three channels. But as the CNN processing proceeds from layer to layer, the number of channels may markedly increase over the initial value (or stay the same or even reduce in value).

Another fundamental concept in CNN computation is the concept of a filter. With regard to a filter in the input layer, the pixels may be deemed to be arranged in rows and columns. For example, suppose the filter for the input layer is a 3×3 filter. Such a filter size would involve a square filter window of nine pixels. This filter window may be deemed to be formed by 3 consecutive rows of three pixels each. Alternatively, the window may be deemed be formed by 3 consecutive columns of three pixels each. Each pixel in the filter window is multiplied by a corresponding filter weight and summed to form a filter weight output. The filter window is then convolved across the image to produce a matrix of filter weight outputs that propagate to the next layer. Since there are multiple channels, the outputs of the filter on each channel may be summed to form the filter weight outputs that propagate to the next layer. If the filter size is just 1×1, then the filter computation in any given layer is determined by the multiplication of one pixel with the corresponding filter weight. Such a filter may be denoted as a one-tap filter. Should the filter size be 2×2, the resulting filter may be deemed to be a four-tap filter. Similarly, a filter that is 4×4 may be deemed to be a 16-tap filter, and so on.

The input data to a given layer may be denoted as activation data. In the initial layer of the neural network, the activation is thus equal to the input pixels whereas the activation to a subsequent layer is formed by the outputs of the filters for the previous layer. The precision (number of bits) to express each activation and filter weight depends upon the implementation. In the following discussion it will be assumed that each filter weight is 4-bits wide (a nibble) and that each activation is one-byte wide, but it will be appreciated that other bit widths may be used in alternative implementations. Suppose a layer has sixty-four channels with eight activations and sixty-four filter weights. The number of multiplications of each 4-bit filter weight times each 8-bit activations is eight due to the eight activations. So that is eight multiplication operations for each channel for each filter weight. Repeating this multiplication across the 64 channels leads to 512 multiplication operations for each filter weight across all the channels. Since there are sixty-four filter weights, there are 512×64=16,384 multiplications per filter tap. The results of these 16,384 multiplications must then be added, which leads to approximately another 16,383 additions. The number of operations per filter tap is thus approximately 65,500. Should these computations be repeated at a 550 MHz rate, the resulting CNN processing requires approximately 32.8 trillion operations per second (TOPs).

As noted earlier, achieving such a relatively-fast computation speed in a traditional compute-in-memory (CiM) architecture is problematic. A compute-in-memory bitcell is advantageous in that a filter weight bit is stored relatively close to the logic gate and capacitor that stores the result of the multiplication of the filter weight bit with the corresponding activation bit. The resulting charge on a plurality of the capacitors may then be accumulated. This analog accumulation of charge is very efficient as compared to a digital multiply and accumulate operation. But then the accumulated charge is converted to a digital value in an ADC. To achieve a relatively-high rate of computation speed with sufficient resolution in an ADC is typically expensive and problematic such that traditional digital computers are used for high-speed neural network calculations (e.g., in excess of 10 TOPS). As will be explained further herein, the hybrid CiM architecture disclosed herein advantageously achieves the speed of a traditional digital computer architecture with the power savings of CiM.

There are several significant differences between a hybrid CiM architecture and a traditional CiM architecture. In a traditional CiM bitcell, the filter weight bit is stored by a pair of cross-coupled inverters. From the cross-coupled inverters, the filter weight bit couples through a first switch controlled by an activation bit. Depending upon a binary value of the activation bit, this activation-bit-controlled first switch is either open to prevent the filter weight bit from passing or closed to allow the filter weight bit to pass to a plate of a capacitor. A traditional CiM bitcell may include a second activation-bit-controlled switch controlled by a complement of the activation bit to selectively pass a complement of the filter weight bit to the capacitor plate. Regardless of how the activation-bit-controlled switches are implemented, a traditional CiM bitcell does not follow the foundry ground rules for a static random-access memory (SRAM) six-transistor bitcell. An SRAM six-transistor bitcell is denoted herein as a foundry bitcell as the foundry establishes the ground rules for its layout. An array of traditional CiM bitcells is thus not as dense as a comparable array of foundry bitcells.

To advantageously increase density, the filter weight bits in a hybrid CiM are stored in foundry bitcells. Since a foundry bitcell just has four transistors to form a pair of cross-coupled inverters and a corresponding pair of access transistors to form a total of six transistors, there is no room in a foundry bitcell for any additional switches for the multiplication of the filter weight bit with an activation bit. The multiplication of a filter weight bit by an activation bit in a hybrid CiM thus occurs in an arithmetic cell that is adjacent or near the foundry bitcells for the filter weight bits.

In an arithmetic cell for a hybrid CiM, the filter weight bit does not pass through a switch controlled by the activation bit. Instead, the filter weight bitcell controls a first switch in series with a second switch controlled by the activation bit. The serial combination of the first and second switches couples to a plate of a capacitor. Note that it is arbitrary as to which switch in the switch pair is denoted as the first switch and the second switch. It is thus equivalent to describe the hybrid CiM as including a first switch controlled by the activation bit and a second switch controlled by the filter weight bit. Each switch may be implemented by a single switch transistor. The polarity of the switch transistors may be either both p-type metal-oxide-semiconductor (PMOS) or both n-type metal-oxide semiconductor (NMOS). In a PMOS implementation, the two switch transistors are in series between the plate of the capacitor and a power supply node for a power supply voltage. In such an implementation, another plate of the capacitor is grounded. The capacitor is then charged to the power supply voltage if both the PMOS switch transistors are on. In an NMOS implementation, the capacitor is pre-charged and then discharged if both the NMOS switch transistors are on. Since the use of PMOS switch transistors simplifies the ADC implementation, the following discussion will be directed to a PMOS switch transistor implementation of the switch transistors without loss of generality.

The filter weight bitcell in a hybrid CiM may be constructed according to the same foundry rules as used for the traditional SRAM bitcell. This is quite advantageous for increasing density and ease of implementation. The first switch transistor and the second switch transistor are not integrated into the filter weight bitcell footprint but instead are located within the die footprint of the arithmetic cell. At its simplest form, an arithmetic cell is thus formed by the first switch transistor, the second switch transistor, and the capacitor. An example array 100 of N arithmetic cells is shown in FIG. 1. For illustration clarity, only an initial zeroth arithmetic cell 105 and a (N−1)th arithmetic cell 110 from array 100 are shown in FIG. 1, where N is a positive plural integer. The value of N is less than a number M of the channels for the filter tap being calculated. For example, if there are 64 channels (M=64), an example value of N may be eight. Each arithmetic cell includes a first switch S1 controlled by the activation bit (Act) that is in series with a second switch S2 controlled by the filter weight bit. As noted earlier, it is arbitrary as to which switch in such a switch pair is denoted as the first switch and as the second switch. The serial combination of the pair of switches S1 and S2 (which may also be designated as a switch pair) couples between a power supply node and a plate of the arithmetic cell's capacitor C. As discussed previously, the switches S1 and S2 may be formed either by a pair of NMOS switch transistors or a pair of PMOS switch transistors.

Prior to a calculation, the capacitor C in each arithmetic cell is grounded. If both switches are then closed, the capacitor C is charged. If switch S1 and/or switch S2 remains open, the capacitor C remains discharged. Thus, if switch S1 is configured to close only when the activation bit is true and switch S2 is configured to close only when the filter weight bit is true, the capacitor charge represents a binary multiplication of the activation bit and the filter weight bit. It may be shown that the charging (or not) of the capacitor C through the action of switches S1 and S2 in an arithmetic cell is equivalent to a NOR operation of the filter weight bit and the activation bit. Each arithmetic cell performs its own calculation as to whether its corresponding capacitor is charged or not during a calculation phase. During a subsequent accumulation phase, switches S1 and S2 are opened and a third switch S3 in each arithmetic cell closes in response to an assertion of a sum signal. Each third switch S3 couples between the plate of the arithmetic cell's capacitor C and an input terminal to an ADC 115. The resulting charge presented to ADC 115 is thus a partial product of the bit-wise multiplication and accumulation of the filter tap since N is less than the number M of channels.

In the following description, each pair of switches S1 and S2 may also be denoted as a switch pair. Each switch pair has a corresponding capacitor for storing charge should both switches in the switch pair be switched on. The activation bits for array 100 may be denoted as a plurality of first bits. For every switch pair, there is a corresponding first bit from this plurality of first bits. Similarly, the filter weight bit may be denoted as a second bit.

In the example implementation in which M (the total number of channels) is 64 and N (the subset of channels for the partial product) is eight, there would thus be eight arrays 100 and eight ADCs 115 to complete the bit-wise multiplication and summation of a filter tap. Depending upon the binary significance of the filter weight bit and the activation bit, the resulting partial products are shifted and summed by a shift and sum circuit 120 coupled to an output terminal of ADC 115 to provide the filter tap output. For example, suppose the filter weight and activation are each expressed with only one bit of precision. In that case, shift and sum circuit 120 needs merely to sum the partial products as there is no need to shift. If the filter weight and activation are each expressed with two bits, then four separate partial products are summed with the appropriate shifting depending upon the binary significance of the activation bit and filter weight bit being multiplied. Shift and sum circuit 120 may also be denoted as a digital adder.

Regardless of the precision of the activation and filter weight, the resulting partial product is quite advantageous even though additional ADCs are required over a traditional CiM accumulation that accumulates over all the channels. By accumulating over all the channels as performed in a traditional CiM calculation, only a single ADC would be sufficient. But to accumulate over 64 channels requires an ADC with seven bits of dynamic range. Such a relatively-high dynamic-range ADC consumes power and increases costs. By accumulating only over a subset of the channels, ADC 115 in array 100 may have reduced dynamic range and thus demand less power and reduce costs. For example, ADC 115 may have only four bits of dynamic range to accommodate the accumulation over eight channels in array 100 (note that an eight-channel accumulation does not correspond to three bits of dynamic range because the resulting partial sum may range from zero to eight, which gives nine possible values). The partial accumulation in a hybrid CiM results in the addition of the partial products in the digital domain in the shift and sum circuit 120. Since these digital additions would not be performed in a traditional CiM accumulation across all channels, one may thus appreciate the "hybrid" nature of a hybrid CiM architecture in that the accumulation is performed partly in the analog domain and partly in the digital domain. A hybrid CiM architecture thus enjoys the power savings of analog multiplication and accumulation performed by the charge sharing between the capacitors C yet does not suffer from excessive power consumption in the ADCs 115 because the partial accumulation reduces their required dynamic range.

The Arithmetic Cell

Figure 2A:
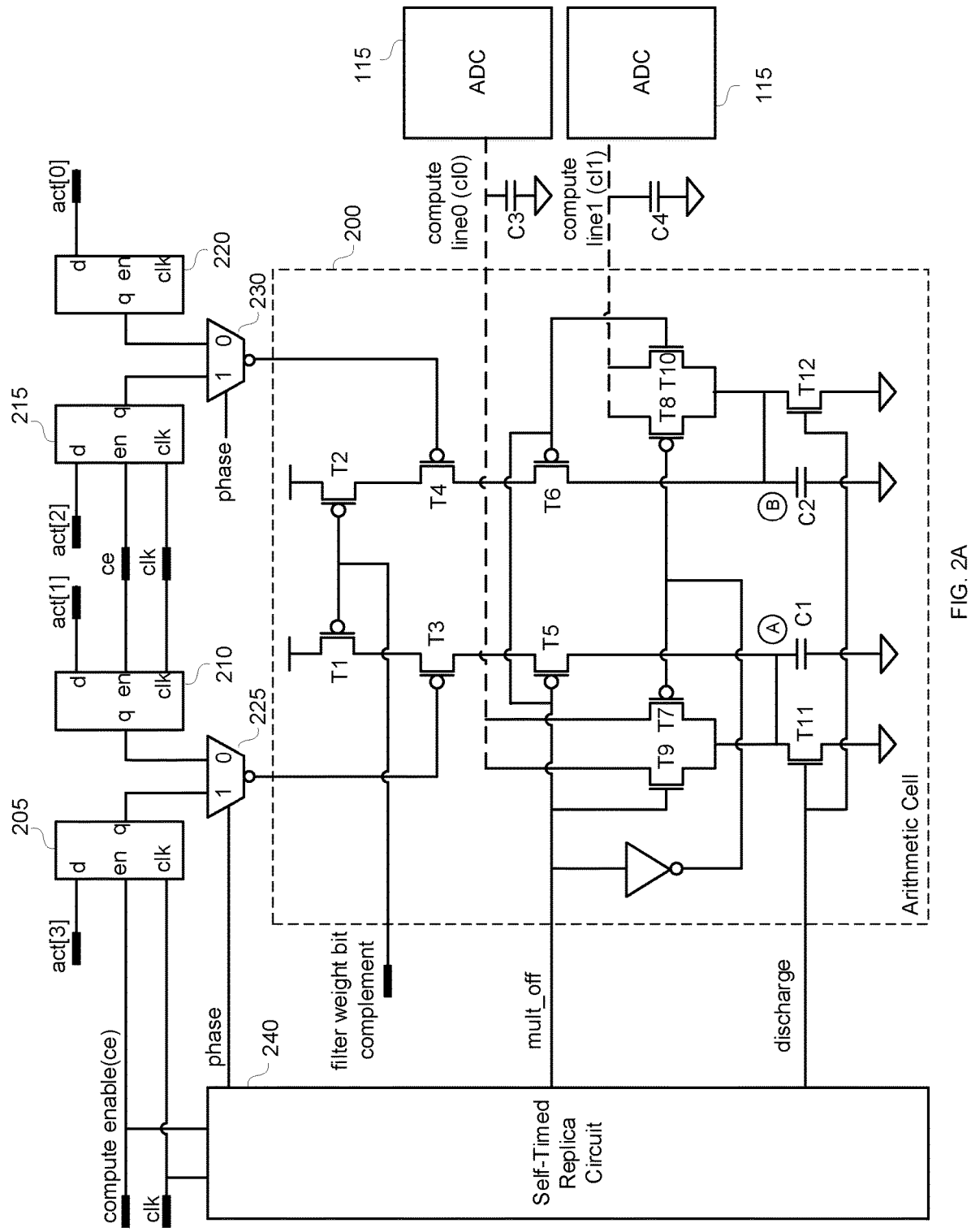
FIG. 2A illustrates an example arithmetic cell for a hybrid compute-in-memory in accordance with an aspect of the disclosure.

An example arithmetic cell 200 is shown in more detail in FIG. 2A. Arithmetic cell 200 processes the multiplication of two activation bits with a filter weight bit in a first processing phase designated herein as phase 1. Similarly, arithmetic cell 200 processes the multiplication of another two activation bits with the filter weight bit in a second processing phase designated herein as phase 2. A phase signal controls the timing of the two phases, which occur during a period of a clock signal (clk). To make the multiplications robust to any duty cycle distortions of the clock signal, a self-timed replica circuit 240 controls the phase signal as will be explained further herein.

During phase 1, the phase signal is in a first binary state. Conversely, the phase signal is a second complementary binary state during phase 2. In the following discussion, it will be assumed that the phase signal is discharged to ground during phase 1 and charged to the power supply voltage VDD during phase 2 but this convention may be reversed in alternative implementations. The phase signal controls the selection of an activation bit in a multiplexer 225 and the selection of an activation bit in a multiplexer 230.

The four activation bits processed by arithmetic cell 200 are designated as act[0], act[1], act[2], and act[3]. A register 205 registers act[3] when enabled by a compute enable (ce) signal and clocked by the clock signal. Similarly, a register 210 registers act[1], a register 215 registers act[2], and a register 220 registers act[0]. Registers 205 and 210 may be denoted herein as a register pair. Similarly, registers 215 and 220 form another register pair. Depending upon the binary state of the phase signal, multiplexer 225 selects for act[3] from register 205 or act[1] from register 210. Similarly, multiplexer 230 selects for act[2] from register 215 or act[0] from register 220 depending upon the binary state of the phase signal.

Both multiplexers 225 and 230 are inverting multiplexers that invert their selected activation bit. The selected activation bit from multiplexer 225 drives a gate of a PMOS switch transistor T3. Switch transistor T3 is thus the equivalent of switch S1 in each of the arithmetic cells in array 100 of FIG. 1. A source of switch transistor T3 couples through a PMOS switch transistor T1 to a power supply node for a power supply voltage VDD. A complement of the filter weight bit drives a gate of switch transistor T1. Switch transistor T1 is thus the equivalent of switch S2 in each of the arithmetic cells in array 100. A drain of switch transistor T3 couples to a plate A of a capacitor C1 through a PMOS switch transistor T5. Switch transistor T5 is in series with the first switch and second switch formed by switch transistors T1 and T3. An active-high multiplication off (mult_off) signal drives the gate of switch transistor T5. Self-timed replica circuit 240 controls the mult_off signal so that it is discharged during an initial multiplication portion of both phase 1 and phase 2. In phase 1, multiplexer 225 selects for the complement of the activation bit act[1]. Should both act[1] and the filter weight bit be true, switch transistors T1 and T3 will conduct a charging current into plate A of capacitor C1. Capacitor C1 is an example of capacitor C in the arithmetic cells in array 100. The charging current will then charge capacitor C1 so that a voltage of plate A rises to the power supply voltage VDD. As will be explained further herein, self-timed replica circuit 240 also mimics or replicates the charging of capacitor C1. When the self-timed replica circuit 240 has determined that the multiplication portion of phase 1 has had a sufficient time to charge capacitor C1, self-timed replica circuit 240 will assert the mult_off signal to electrically disconnect capacitor C1 from the power supply voltage VDD. This assertion of the mult_off signal switches off switch transistor T5 to stop the charging of capacitor C1. At the same time, the assertion of the mult_off signal switches on an NMOS pass transistor T9 that couples between plate A and a compute line 0 (cl0). Similarly, an inverter 241 inverts the mult_off signal to drive a gate of a PMOS pass transistor T7 that also couples between plate A and the compute line 0.

Pass transistors T9 and T7 thus form a transmission gate that closes to couple plate A to the compute line 0 when the mult_off signal is asserted. The transmission gate formed by pass transistors T9 and T7 is an example of the third switch S3 in each arithmetic cell in array 100. A compute line capacitor C3 loads the compute line 0. Note that compute line 0 will couple to M arithmetic cells as discussed analogously for array 100 with regard to the processing by ADC 115 (M being the subset of channels from the total number of channels for the filter). Since the following discussion will assume that M is eight without loss of generality, a capacitance compute line capacitor C3 may thus be approximately eight times the capacitance of capacitor C1. In this fashion, a voltage of compute line 0 will range from zero volts to approximately VDD/2 depending upon how many of its eight arithmetic cells charge their capacitor C1 to VDD.

The selected activation bit from multiplexer 230 drives a gate of a PMOS switch transistor T4. Switch transistor T4 is thus the equivalent of switch S1 in each of the arithmetic cells in array 100 of FIG. 1. A source of switch transistor T4 couples through a PMOS switch transistor T2 to the power supply node. The complement of the filter weight bit drives a gate of switch transistor T2. Switch transistor T2 is thus the equivalent of switch S2 in each of the arithmetic cells in array 100. A drain of switch transistor T4 couples to a plate B of a capacitor C2 through a PMOS switch transistor T6. The mult_off signal drives the gate of switch transistor T6. In phase 1, multiplexer 230 selects for the complement of the activation bit act[0]. Should both act[0] and the filter weight bit both be true, switch transistors T4 and T6 will conduct a charging current into plate B of capacitor C2. Capacitor C2 is an example of capacitor C in the arithmetic cells in array 100. The charging current will then charge capacitor C2 so that a voltage of plate B rises to the power supply voltage VDD. When the self-timed replica circuit 240 has determined that the multiplication portion of phase 1 has had a sufficient time to charge capacitor C2, self-timed replica circuit 240 asserts the mult_off signal to disconnect capacitor C2 from the power supply voltage VDD to begin an accumulation portion of phase 1. This assertion of the mult_off signal switches off switch transistor T6 to stop the charging of capacitor C2. At the same time, the assertion of the mult_off signal closes a transmission gate formed by a PMOS pass transistor T8 and an NMOS pass transistor T10 analogously as discussed with regard to pass transistors T9 and T7. The transmission gate formed by pass transistors T8 and T10 is an example of the third switch S3 in each of the arithmetic cells of array 100.

The transmission gate formed by pass transistors T8 and T10 closes to couple plate B to a compute line 1 when the mult_off signal is asserted. A compute line capacitor C4 loads the compute line 1 analogously as discussed for compute line capacitor C3. For example, a capacitance of compute line capacitor C4 may be approximately eight times a capacitance of each capacitor C2. In this fashion, a voltage of the compute line 1 will range from zero volts to approximately VDD/2 depending upon how many of its eight arithmetic cells charge their capacitor C2 to VDD. Self-timed replica circuit 240 controls each ADC 115 to digitize the voltage on their respective control line as will be explained further herein.

In phase 2, multiplexer 225 selects for activation bit act[3]. Similarly, multiplexer 230 selects for activation bit act[2] in phase 2. The four activation bits act[0] through act[3] will thus be multiplied by the filter weight bit in one cycle of the clock signal clk. At the termination of each phase 1 and phase 2 cycle, the self-timed replica circuit 240 resets capacitors C1 and C2 through an assertion of a discharge signal. The discharge signal drives a gate of an NMOS switch transistor T11 that couples between plate A of capacitor C1 and ground. Capacitor C1 is thus discharged to ground at the assertion of the discharge signal. Similarly, the discharge signal drives a gate of an NMOS switch transistor T12 that couples between plate B of capacitor C2 and ground. Capacitor C2 is thus discharged to ground at the assertion of the discharge signal.

Figure 2B:
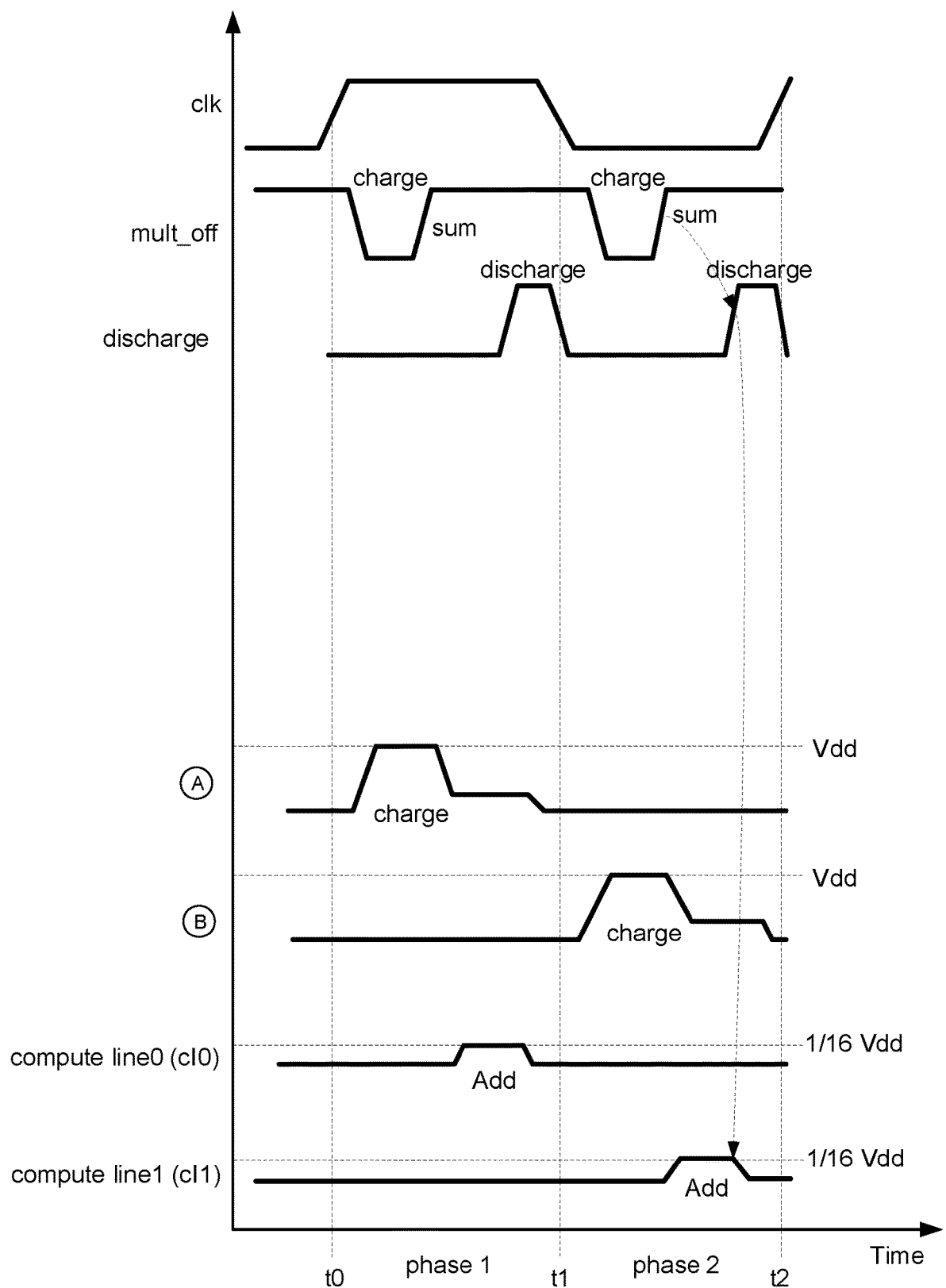
FIG. 2B illustrates some example operating waveforms for the arithmetic cell of FIG. 2A.

Some operating waveforms for arithmetic cell 200 are shown in FIG. 2B. A cycle of the clock signal clk begins at a time t0 with a rising edge of the clock signal to begin phase 1. In FIG. 2B, the clock signal has a 50/50 duty cycle so the falling edge of the clock signal at a time t1 triggers phase 2 but it will be appreciated that the timing of phase 1 and phase 2 need not be synchronous with the clock edges due to the operation of self-timed replica circuit 240. The rising edge of the clock signal causes the mult_off signal to be discharged so that the corresponding arithmetic cell capacitor C1 or C2 may be charged, depending upon the binary values of the respective activation and filter weight bits. In this example, it is assumed that the filter weight and activation bit binary values are such that capacitor C1 gets charged in phase 1 while mult_off is discharged whereas capacitor C2 remains discharged. Plate A thus gets charged to VDD during phase 1 as a result of the discharge of the mult_off signal. When the mult_off signal is then asserted during phase 1 to begin the accumulation portion of phase 1, the charge on capacitor C1 is shared with compute line 0 so that compute line 0 is boosted to VDD/16 (assuming no other channels provide any charge to compute line 0). After the charge sharing in phase 1, the discharge signal is asserted to reset capacitors C1 and C2 to complete phase 1. In phase 2, the mult_off signal is again discharged. It assumed that the filter weight and activation bit binary values are such in phase 2 that capacitor C2 is charged to the power supply voltage VDD whereas capacitor C1 remains discharged. Plate B thus gets charged to VDD during phase 2 as a result of the discharge of the mult_off signal. After the mult_off signal is asserted in phase 2 to begin the accumulation portion of phase 2, the charge on capacitor C2 is shared with compute line 1. The compute line 1 voltage is thus boosted to VDD/16 (assuming no other channels provide charge to compute line 1). Finally, the discharge signal is again asserted to reset capacitors C1 and C2 to complete phase 2, whereupon a new clock cycle begins at a time t2.

The Self-Timed Replica Circuit

Figure 3A:
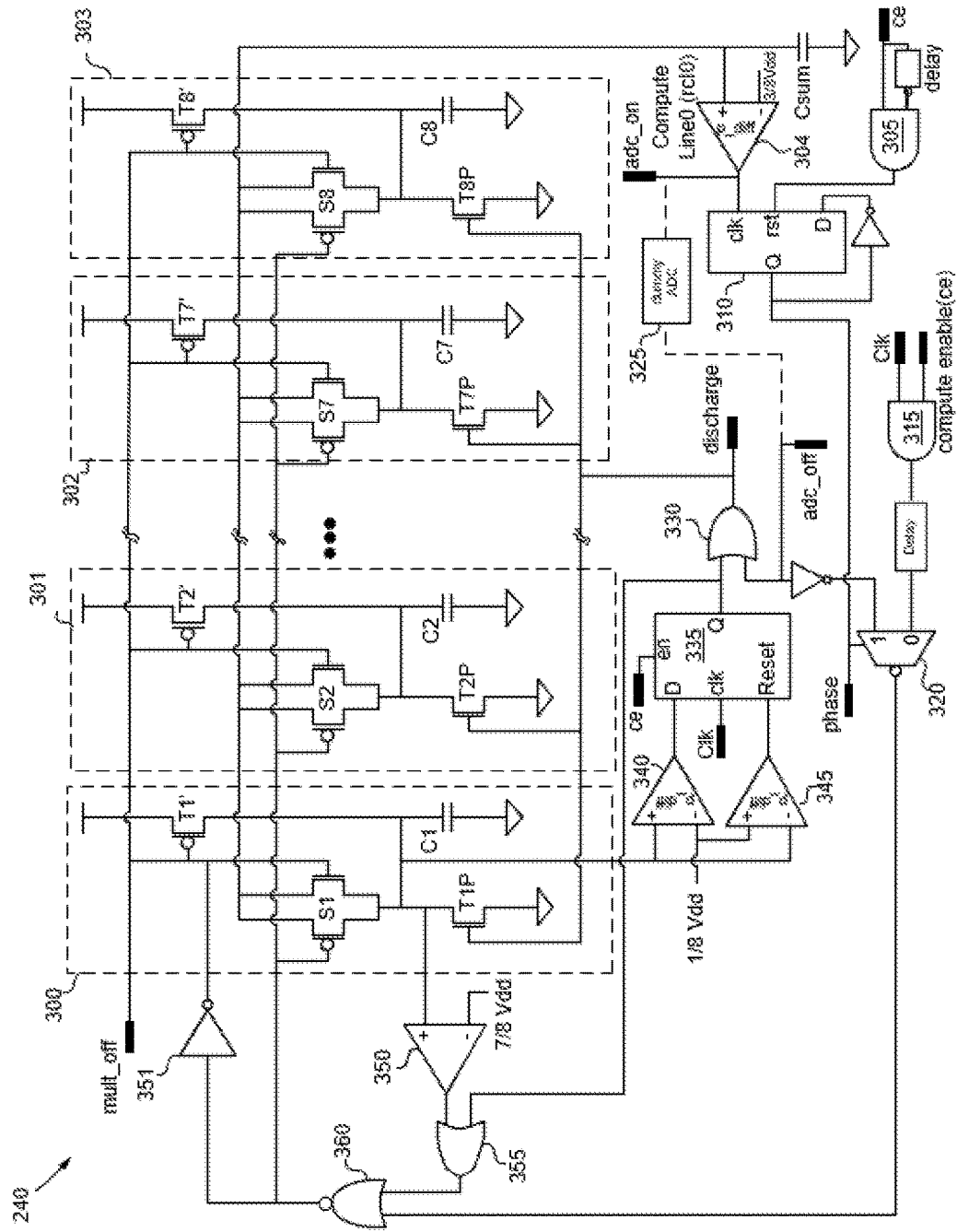
FIG. 3A illustrates an example self-timed replica circuit in accordance with an aspect of the disclosure.

An example self-timed replica circuit 240 is shown in more detail in FIG. 3A. Self-timed replica circuit 240 includes eight replica arithmetic cells ranging from a first replica arithmetic cell 300 to an eighth replica arithmetic cell 303 to replicate the accumulation discussed with regard to array 100 and arithmetic cell 200. For illustration clarity, only the first replica arithmetic cell 300, a second replica arithmetic cell 301, a seventh replica arithmetic cell 302, and the eighth replica arithmetic cell 303 are shown in FIG. 3A. A switch transistor T1' in the first replica arithmetic cell 300 replicates switch transistor T5 in arithmetic cell 200. Switch transistor T1' may also be denoted herein as a fourth switch transistor. A source of switch transistor T1' couples to the power supply node whereas its drain couples to a plate of a replica capacitor C1 that replicates capacitor C1 (or capacitor C2) in arithmetic cell 200. The mult_off signal drives a gate of switch transistor T1'. The gate of switch transistor T1' is thus coupled to the gate of switch transistors T5 and T6 since these transistors are also controlled by the mult_off signal. The discharge of the mult_off signal will thus switch on switch transistor T1' so that replica capacitor C1 begins charging to VDD to mimic the charging of capacitor C1 (or capacitor C2). A comparator 350 determines when the replica capacitor C1 has charged sufficiently towards VDD by comparing the voltage across the replica capacitor C1 to a suitable threshold voltage (e.g., ⅞ VDD). An output signal of comparator 350 will thus be asserted when the replica capacitor C1 has charged to ⅞ VDD. An OR gate 355 receives the output signal of comparator 350 so that an output signal of OR gate 355 will also be asserted by charging of the replica capacitor C1. A NOR gate 360 receives the output of OR gate 355. An output signal of NOR gate 360 will thus be discharged by the charging of the replica capacitor C1. The output signal of NOR gate 360 is inverted by an inverter 351 to form the mult_off signal. The mult_off signal will thus be asserted in response to comparator 350 determining that the replica capacitor C1 has been charged to the threshold voltage (e.g., ⅞ VDD).

A transmission gate S1 couples from the plate of replica capacitor C1 to a replica compute line rcl0. The output signal from NOR gate 360 drives a gate of a PMOS transistor in transmission gate S1 whereas the mult_off signal drive a gate of an NMOS transistor in transmission gate S1. Transmission gate S1 will thus close when the mult_off signal is asserted so that the charge from replica capacitor C1 is shared with replica compute line rcl0. Each additional replica arithmetic cell includes an analogous replica switch transistor, replica capacitor, and transmission gate arranged analogously as discussed for first replica arithmetic cell 300. For example, second replica arithmetic cell 301 includes a replica switch transistor T2', a replica capacitor C2, and a transmission gate S2. Similarly, seventh replica arithmetic cell 302 includes a replica switch transistor T7', a replica capacitor C7, and a transmission gate S7. Finally, eighth replica arithmetic 303 includes a replica switch transistor T8', a replica capacitor C8, and a transmission gate S8. These additional arithmetic cells will thus charge their replica capacitor while the mult_off signal is discharged and then share the resulting charge from their replica capacitor with the replica compute line rcl0.

A capacitor Csum loads the replica compute line rcl0 with a capacitance that is approximately equal to a sum of the capacitance of the replica capacitors in the replica arithmetic cells. The sharing or accumulation of the charge from the replica capacitors while the mult_off signal is asserted will thus charge the replica compute line rcl0 to approximately VDD/2 to mimic the charging of the compute lines 1 or 2 discussed with regard to FIG. 2A. To determine when the charge sharing has sufficiently charged the replica compute line rcl0 to VDD/2, a comparator 304 compares a voltage of the replica compute line rcl0 to a suitable threshold voltage equal to approximately VDD/2 such as ⅜ VDD. An output signal of comparator 304 will thus be asserted as the voltage of the replica compute line rcl0 approaches VDD/2. This output signal functions as an ADC enable (adc_on) that triggers each ADC 115 (FIGS. 1 and 2A) to digitize the voltage on its respective compute line.

The output signal from comparator 304 clocks a register 310. At the beginning of a compute cycle, the assertion of the compute enable signal ce drives an AND gate 305. Prior to the assertion of the compute enable signal (ce), a delayed and inverted version of the compute enable signal will be asserted high. This delayed and inverted version of the compute enable signal is also received by AND gate 305. An output signal of AND gate 305 will thus be pulsed high at the assertion of the compute enable signal for a pulse width that is determined by the delay of the delayed and inverted version of the compute enable signal. The pulsing of the output signal from AND gate 305 resets register 310. An output signal of register 310 forms the phase signal that controls the selection by multiplexers 225 and 230 (FIG. 2A). At the beginning of a compute cycle, the phase signal will thus be discharged from the reset of register 310 to begin operation in phase 1. The phase signal is inverted and drives a data input to register 310. This data input will thus be charged to the power supply voltage VDD at the beginning of a compute cycle. When register 310 is clocked by the assertion of the output signal from comparator 304 in response to the charging of the replica compute line rcl0, the phase signal will thus be asserted to the power supply voltage VDD to begin phase 2 operation.

The phase signal controls the selection by an inverting multiplexer 320. An AND gate 315 asserts its output signal when both the compute enable signal and the clock signal are asserted. An output signal of AND gate is delayed and drives an input to the inverting multiplexer 320 that is selected when the phase signal is discharged during phase 1. An output signal of the inverting multiplexer 320 will thus be zero at the start of a compute cycle. This output signal is received by NOR gate 360 discussed previously.

A dummy ADC 325 replicates the amount of time required by each ADC 115 to perform its digitization. An output signal adc_off from dummy ADC 325 will thus be asserted after the ADC digitization time. The adc_off signal is received by an OR gate 330 that produces the discharge signal. The discharge signal will thus be asserted after each ADC digitization is completed. The adc_off signal is inverted and received by inverting multiplexer 320. The assertion of the phase signal during phase 2 causes inverting multiplexer 320 to select for the inverted adc_off signal so that the output signal from inverting multiplexer 320 is asserted when the ADC digitization is completed. The mult_off signal is thus reset (discharged) after the ADC digitization is completed.

The assertion of the discharge signal causes each replica arithmetic cell to discharge its replica capacitor. For example, first replica arithmetic cell 300 includes an NMOS switch transistor T1P coupled between the plate of replica capacitor C1 and ground. The discharge signal drives a gate of switch transistor T1P. Switch transistor T1P will thus switch on in response to the assertion of the discharge signal so that replica capacitor C1 discharges. Second replica arithmetic cell 301 includes an analogous NMOS switch transistor T2P. Similarly, seventh replica arithmetic cell 302 includes an NMOS switch transistor T7P whereas eighth replica arithmetic cell 303 includes an NMOS switch transistor T8P.

To test whether the discharge of the replica capacitors was sufficient, a comparator 340 compares the voltage across replica capacitor C1 to a suitable threshold voltage such as VDD/8. An output signal of comparator 340 is asserted when the voltage across replica capacitor C1 is greater than this threshold voltage. The output signal of comparator 340 drives a data input of a register 335 that is enabled by the compute enable signal. The clock signal clocks register 335 so that register 335 registers the output signal of comparator 340 at the rising edge of the clock signal. If the output signal of comparator 340 is high at the clock rising edge, a data output signal of register 335 will also be asserted. This data output signal is received by OR gate 330 that produces the discharge signal. The discharge signal will thus be asserted in response to this error condition. A comparator 345 determines when the voltage across replica capacitor C1 is less than the threshold voltage (e.g., VDD/8) to reset register 335 during normal operation.

Figure 3B:
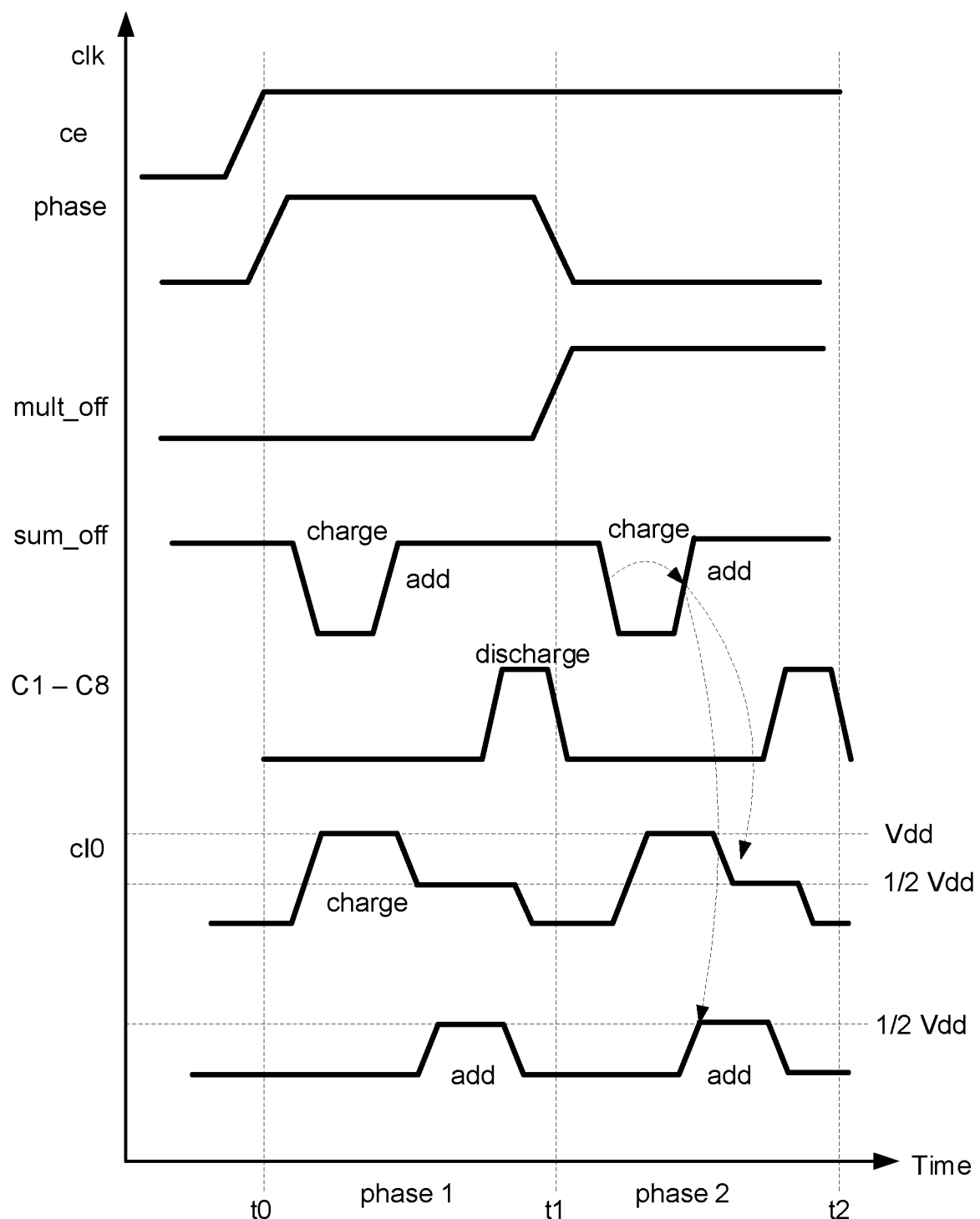
FIG. 3B illustrates some example operating waveforms for the self-timed replica circuit of FIG. 3A.

Some operating waveforms for self-timed replica circuit 240 are shown in FIG. 3B. The compute enable signal (ce) and the clock signal (clk) are both asserted at a time t0 to begin phase 1. The phase signal is discharged during phase 1 as discussed previously. The discharge of the mult_off signal causes the replica capacitors C1 to C8 to be charged to the power supply voltage VDD. As the mult_off signal is again asserted, the charge sharing occurs with the replica compute line rcl0 so that the replica capacitors and the replica compute line rcl0 are all charged to VDD/2. Finally, the discharge signal is asserted to compete phase 1. Operation during phase 2 is analogous except that the phase signal is charged to the power supply voltage VDD.

Example Hybrid CiM Architectures

Figure 4:
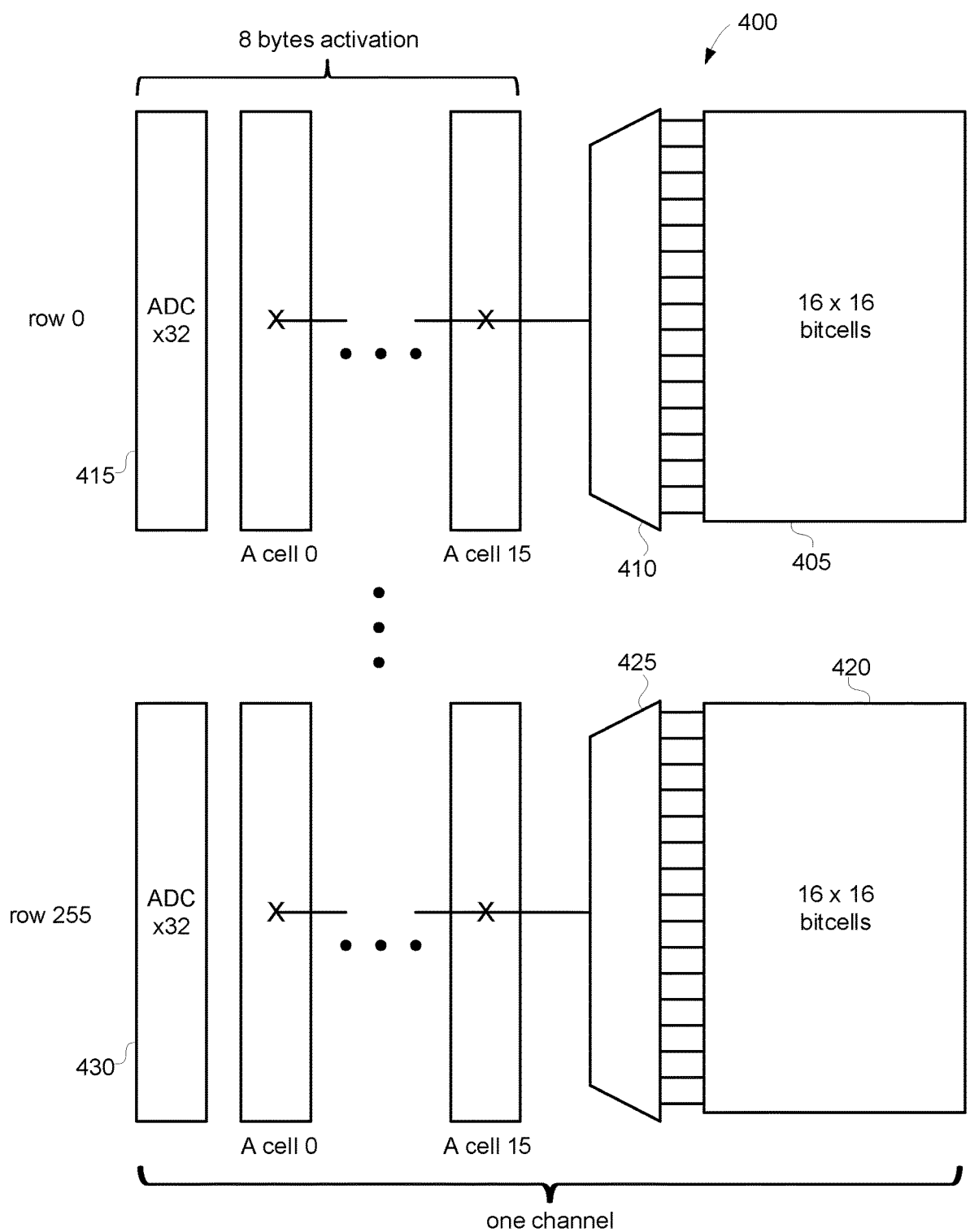
FIG. 4 illustrates a portion of a hybrid compute-in-memory configured to perform a multiply and accumulate operation between a plurality of filter weights and a plurality of activation bits for a single channel in accordance with an aspect of the disclosure.

The number of activation bits that must be multiplied by corresponding filter weight bits at a given layer in a neural network will vary depending upon the implementation. The following example hybrid CiM architecture accommodates the multiplication of 8 activation bytes by 32 filter weight bytes (or equivalently, the multiplication by 64 filter weight nibbles). However, it will be appreciated that the number of activation bytes and filter weight bytes may be varied in alternative implementations. Since each arithmetic cell 200 accommodates the multiplication of four activation bits, eight activation bytes may be processed by sixteen arithmetic cells 200. To accommodate up to a 16×16 filter, each filter weight bit may be stored in a 16×16 bitcell array. A standard foundry bitcell design may be used for each 16×16 bitcell array for high density and low cost. An example hybrid CiM array 400 for the processing of one channel is shown in FIG. 4. Each row corresponds to a filter weight bit. Since there are 32 bytes of filter weight in this example, there 32×8=256 rows ranging from a row 0 to a row 255. Each row includes sixteen arithmetic cells ranging from a zeroth arithmetic cell (A-cell 0) to a sixteenth arithmetic cell (A-cell 15).

Each row includes a 16×16 bitcell array for storing the filter weight bits for the respective filter taps. If the filter being implemented has only one tap, then only one bitcell in the 16×16 bitcell array need store a filter weight bit. But if the filter is a 16×16 filter, then every bitcell in the 16×16 array stores a filter weight bit. For example, consider a 16×16 bitcell array 405 in row 0. The row direction for bitcell array 405 is in the vertical direction in FIG. 4 whereas the columns are in the vertical direction. Each row is traversed by a corresponding word line (not illustrated). During a computation cycle, an address decoder (not illustrated) selects one of the 16 rows in array 405 by asserting the corresponding word line. The bitcells in the asserted row will then load their filter weight bit onto a bit line. Since there are sixteen columns, there are sixteen bit lines for each bitcell array. A 16:1 multiplexer 410 selects for one of the sixteen columns in array 405 by selecting from the sixteen bit lines to provide the selected filter weight bit as an output signal that is projected across the sixteen arithmetic cells in row 0. Since the multiplications by each arithmetic cell 200 may be digitized by two ADCs 115 as discussed with regard to FIG. 3A, row 0 includes 32 ADCs 415. Each additional row is arranged accordingly. For example, row 255 includes a 16×16 bitcell array 420, a 16:1 multiplexer 425, sixteen arithmetic cells, and 32 ADCs 430. Each 16:1 multiplexer such as 16:1 multiplexer 410 and 425 may also be denoted herein as a first multiplexer. Referring again to arithmetic cell 200 of FIG. 2A, each multiplexer 225 and 230 may also be denoted herein as a second multiplexer.

Suppose that the filters for a layer have just one tap each and that each filter weight is one byte. In that case, array 400 could process 32 of such 1×1 filters. Each 16×16 bitcell array would store just one filter weight bit. Should the filters for a layer be 2×2, array could process 32 of such 2×2 filters (assuming each filter weight is one byte). Each 16×16 bitcell array would then store four filter weight bits for the four taps of the respective 2×2 filter. More generally, a hybrid CiM (HCiM) array may process a plurality of filters, each filter having one or more taps.

Array 400 illustrates the bitcell arrays and arithmetic cells for one channel across the full depth of the filter weights. In general, the depth or breadth of the filter weights determines the number of rows. The depth or breadth of the activations determines the number of arithmetic cells for each row. As discussed previously, an HCiM array is deemed to be "hybrid" because the accumulation for the filters are not multiplied and summed in the analog domain across all the channels but instead across a subset of the channels.

Figure 5:
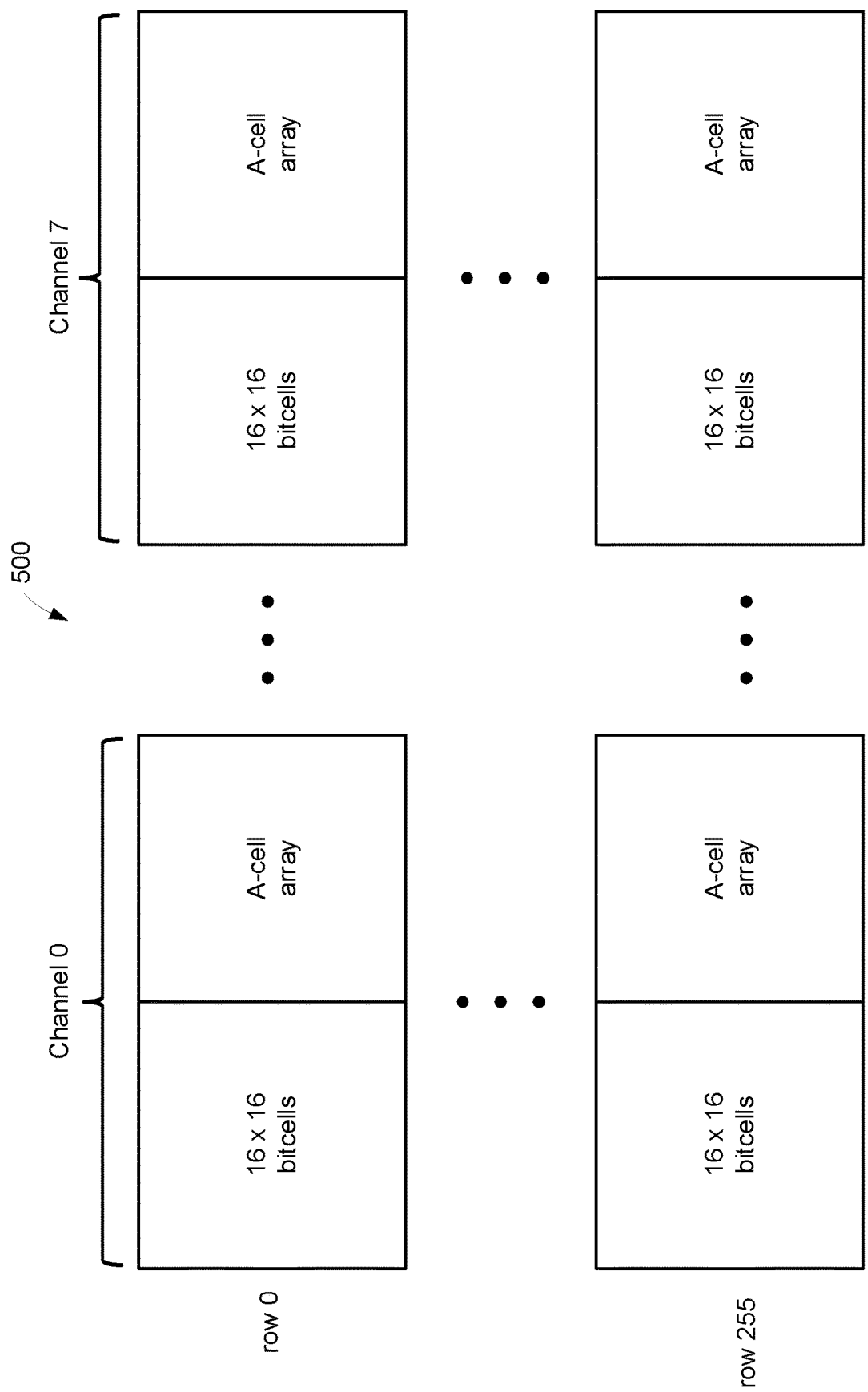
FIG. 5 illustrates a hybrid compute-in-memory including a plurality of bitcell arrays and arithmetic cell arrays configured to perform a multiply and accumulate operation between a plurality of filter weight bits and a plurality of activation bits for a plurality of channels in accordance with an aspect of the disclosure.

In one implementation, there may be 64 channels with each subset of the channels being 8 channels. More generally, the number of channels in each subset of channels is configurable. An example array 500 is shown in FIG. 5. As discussed for array 400, there are 256 rows corresponding to the 256 filter weight bits for 32 bytes of filter weights. Each row includes a bitcell array and a corresponding array of arithmetic cells for each channel. In general, the bitcell array is an M×M array, where M is a plural integer to accommodate filters having M×M taps. The size of each arithmetic cell array depends upon size (width) and depth (number) of activations that may be multiplied. As discussed with regard to array 400, it is assumed for array 500 that that each bitcell array is a 16×16 bitcell array and that each arithmetic cell array is sufficient for the multiplication of the filter weight bit with at least one activation bit. In an implementation in which each arithmetic cell accommodates the multiplication of 4 activation bits as discussed for arithmetic cell 200, the arithmetic cell array for each bitcell array in array 500 would include sixteen arithmetic cells. For example, a row 0 in array 500 includes a 16×16 bitcell array and an array of sixteen arithmetic cells for each channel, ranging from a channel 0 to a channel 7. For illustration clarity, the bitcell and arithmetic cell arrays for just channel 0 and channel 7 are shown in array 500. Each row includes analogous bitcell and arithmetic cell arrays, ranging from row 0 to a row 255. For illustration clarity, only row 0 and row 255 are shown in array 500.

Each row includes an array of 32 ADCs (not illustrated) for summing across the eight bytes of activation. Recall that each ADC 115 as discussed with regard to arithmetic cell 200 may digitize sequentially the multiplication of a filter weight bit with two activation bits in a single clock cycle. With eight bytes of activation, there are 64 activation bits, which thus requires 32 ADCs. More generally, the processing of a plurality of Y activation bits requires Y/2 ADCs in an implementation in which Y is a power of two and each ADC digitizes two multiplication accumulations per clock cycle.

Figure 6:
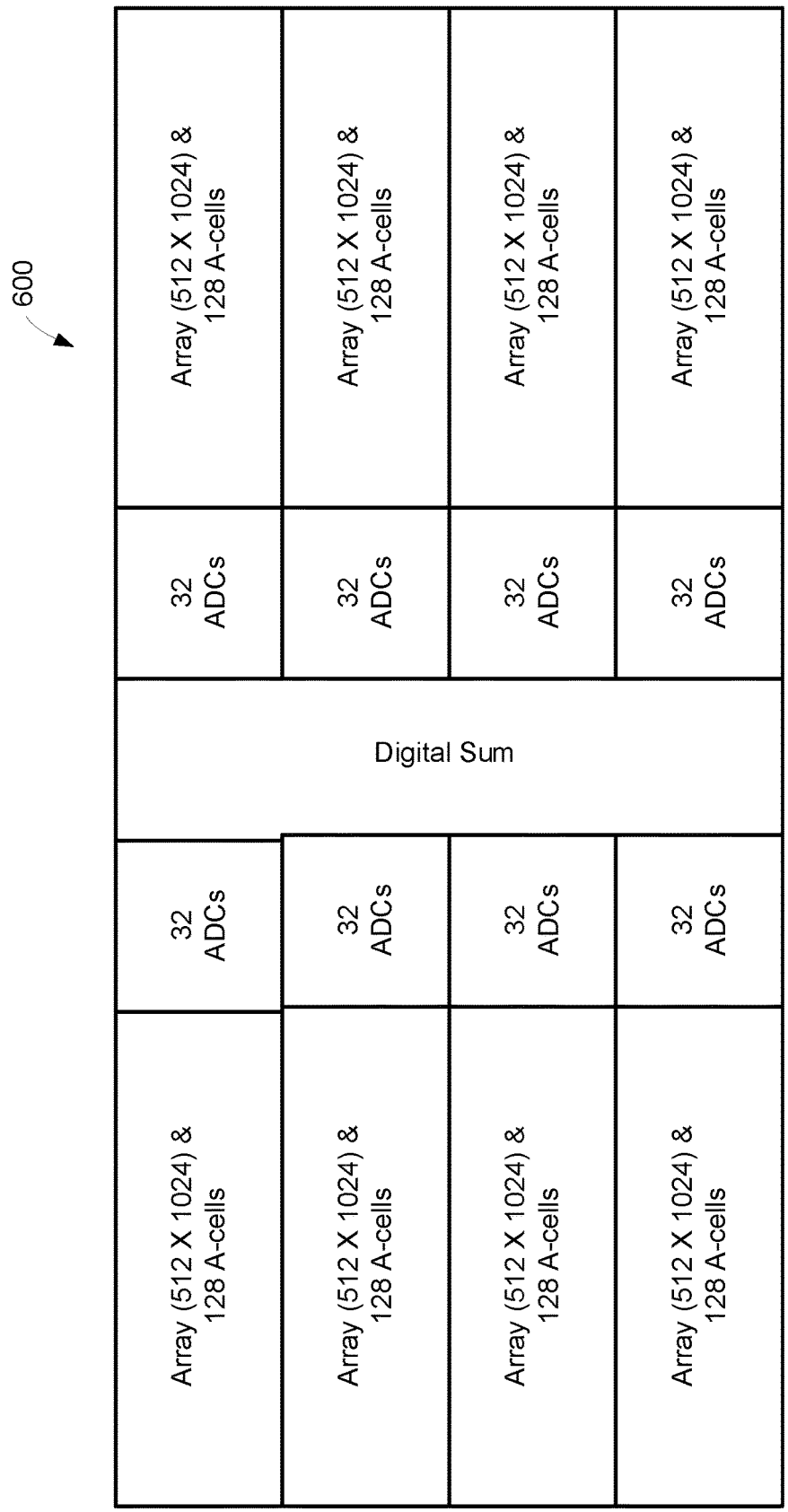
FIG. 6 illustrates a hybrid compute-in-memory for the calculation of at least one filter tap for a plurality of channels in which the hybrid compute-in-memory is divided into subarrays, each subarray configured to perform the calculation of the at least one filter tap for a corresponding subset of the plurality of channels in accordance with an aspect of the disclosure.

Given the 256 rows of eight 16×16 bitcells, the bitcells logically form a collective array size of 4096 bitcell rows by 128 bitcell columns (524,288 bitcells). Such an array may be difficult to integrate onto a semiconductor die due to its relatively long and narrow footprint on the semiconductor die. The 16×16 bitcells arrays may thus be re-arranged to form a more suitable footprint such as 512 rows by 1024 columns that still accommodates the 524,288 bitcells. Since the resulting HCiM array accommodates the multiplication of the filters across just 8 channels, an implementation with 64 channels may include eight of such HCiM sub-arrays. An example server 600 for processing all 64 channels is shown in FIG. 6. To process the accumulation across 8 channels for the various filters, server 600 includes eight subarrays of filter weight bitcells, each sub-array including 512 rows and 1024 columns. Each sub-array of filter weight bitcells includes 16 arithmetic cells for each filter weight bit, which leads to a total of 4,096 arithmetic cells, with each arithmetic cell being able to process the multiplication of four activation bits as discussed for arithmetic cell 200. With 8 bytes of activation (64 bits) being multiplied by each filter weight bit and with one ADC for every 2 bits of activation as discussed for ADCs 115, each filter weight bit corresponds to 32 ADCs. Assuming there are 32 bytes of filter weights (256 bits total), each sub-array in server 600 includes 32×256=8, 192 ADCs. The number of sub-arrays in server 600 is configurable depending upon the implementation. A digital summer sums the partial products accumulated in each sub-array. An example method of operation for a hybrid compute-in-memory will now be discussed.

Figure 7:
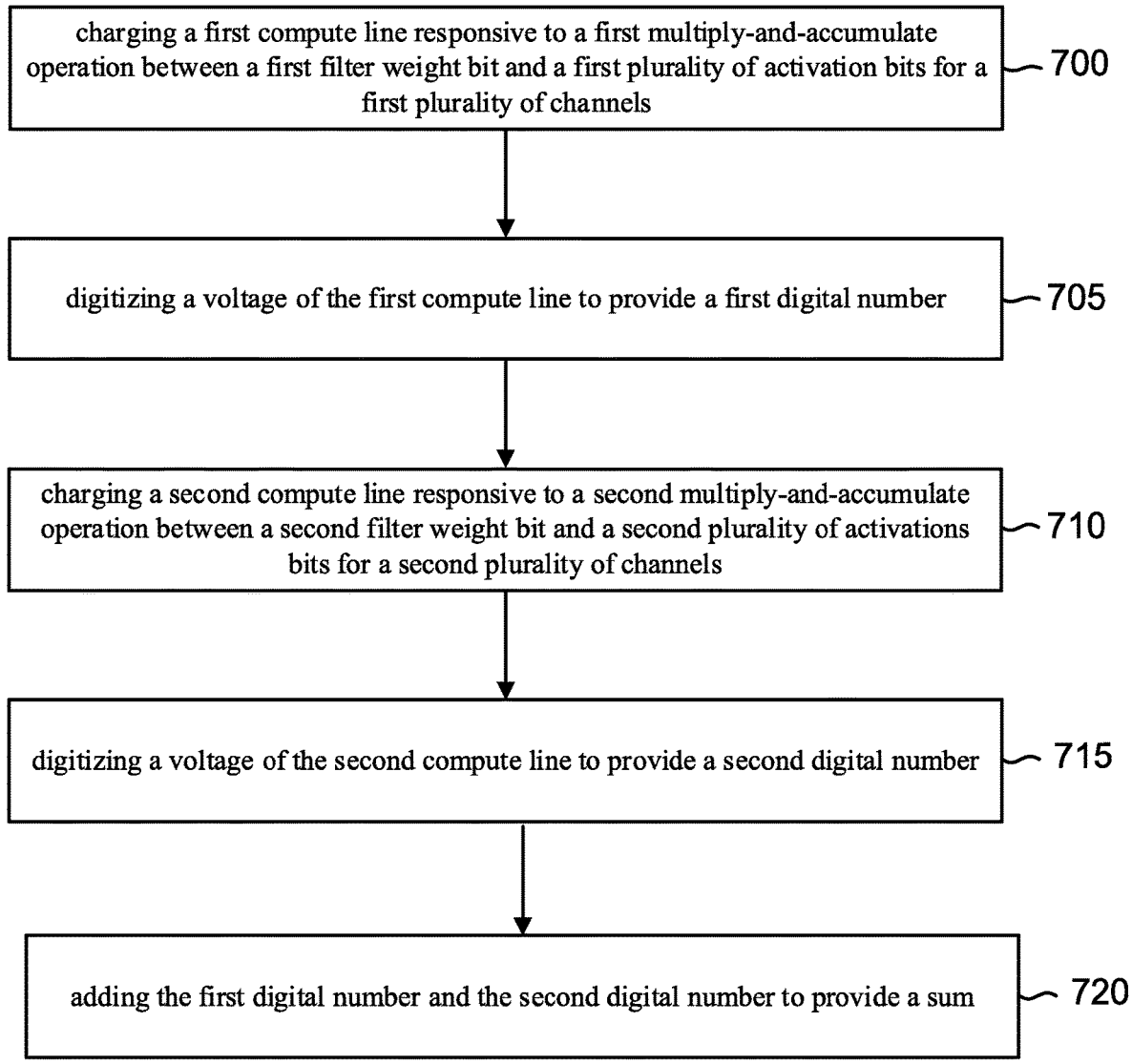
FIG. 7 is a flowchart for an example method of operation for a hybrid compute-in-memory in accordance with an aspect of the disclosure.

FIG. 7 illustrates a flowchart for an example method of operation for a hybrid compute-in-memory. The method includes an act of 700 of charging a first compute line responsive to a multiply-and-accumulate operation between a first filter weight bit and a first plurality of activation bits for a first plurality of channels. The charging of the compute line for array 100 is an example of act 700. The method also includes an act 705 of digitizing a voltage of the first compute line to provide a first digital number. The operation of ADC 115 in array 100 is an example of act 705. Since array 100 is repeated for each subset of channels as discussed regarding array 500 and server 600, the charging of the compute line in array 100 is also an example of an act 710 of charging a second compute line responsive to a multiply-and-accumulate operation between a second filter weight bit and a plurality of activations bits for a plurality of second channels. Similarly, the operation of ADC 115 in array 100 is an example of an act 715 of digitizing a voltage of the second compute line to provide a second digital number. Finally, the operation of digital adder 120 in array 100 as well as the operation of the digital adder in server 600 is an example of an act 720 of adding the first digital number and the second digital number to provide a sum.

Some aspects of the disclosure will now be summarized in the following example clauses.

Clause 1. A compute-in-memory, comprising:
    a plurality of first switch pairs corresponding to a plurality of first bits, each first switch pair including a first switch controlled by a corresponding first bit from the plurality of first bits and including a second switch controlled by a second bit;
    a plurality of first capacitors corresponding to the plurality of first switch pairs, each first capacitor being coupled in series with a corresponding first switch pair from the plurality of first switch pairs;
    a first compute line coupled to the plurality of first capacitors; and
    a first analog-to-digital converter having an input terminal coupled to the first compute line.

Clause 2. The compute-in-memory of clause 1, further comprising;
    a plurality of second switch pairs corresponding to a plurality of third bits, each second switch pair including a first switch controlled by a corresponding third bit from the plurality of third bits and including a second switch controlled by the second bit;
    a plurality of second capacitors corresponding to the plurality of second switch pairs, each second capacitor being coupled in series with a corresponding second switch pair from the plurality of second switch pairs;
    a second compute line coupled to the plurality of second capacitors; and
    a second analog-to-digital converter having an input terminal coupled to the second compute line.

Clause 3. The compute-in-memory of clause 2, wherein the plurality of first bits comprises a plurality of first activation bits, the second bit comprises a filter weight bit, and the plurality of third bits comprises a plurality of second activation bits.

Clause 4. The compute-in-memory of any of clauses 1-3, further comprising:
a plurality of third switches corresponding to the plurality of first switch pairs, each first switch pair being coupled to a corresponding first capacitor of the plurality of first capacitors through a respective one of the third switches.

Clause 5. The compute-in-memory of clause 4, further comprising:
a self-timed replica circuit including a fourth switch transistor in series with a replica first capacitor, wherein each third switch in the plurality of third switches is a third switch transistor and a gate of the fourth switch transistor is coupled to a gate of each third switch transistor.

Clause 6. The compute-in-memory of clause 5, wherein a capacitance of the replica first capacitor is substantially equal to a capacitance of each first capacitor from the plurality of first capacitors.

Clause 7. The compute-in-memory of any of clauses 5-6, wherein each first switch comprises a first p-type-metal-oxide-semiconductor (PMOS) switch transistor, each second switch comprises a second PMOS switch transistor, and each third switch transistor comprises a third PMOS switch transistor.

Clause 8. The compute-in-memory of any of clauses 5-7, wherein the self-timed replica circuit includes a comparator configured to compare the voltage of the first compute line to the threshold voltage.

Clause 9. The compute-in-memory of any of clauses 5-8, further comprising:
a compute line capacitor coupled to the first compute line, wherein a capacitance of the compute line capacitor is approximately equal to a sum of a capacitance of each first capacitor of the plurality of first capacitors.

Clause 10. The compute-in-memory of any of clauses 5-9, wherein the threshold voltage is approximately one-half of a power supply voltage.

Clause 11. The compute-in-memory of clause 8, wherein the self-timed replica circuit is further configured to control a discharge of each first capacitor from the plurality of first capacitors responsive to a detection by the comparator that a voltage of the first compute line is greater than or equal to the threshold voltage.

Clause 12. The compute-in-memory of any of clauses 1-11, further comprising:
a plurality of bitcells; and
a first multiplexer configured to select from the plurality of bitcells to provide the second bit to each second switches in the plurality of first switch pairs.

Clause 13. The compute-in-memory of clause 12, further comprising:
a plurality of second multiplexers corresponding to the plurality of first switch pairs; and
a plurality of register pairs corresponding to the plurality of second multiplexers; wherein each second multiplexer in the plurality of second multiplexers is configured to select the corresponding first bit from a corresponding register pair in the plurality of register pairs.

Clause 14. The compute-in-memory of clause 13, wherein each first switch is a PMOS switch transistor and wherein each second multiplexer is an inverting multiplexer.

Clause 15. The compute-in-memory of clause 5, further comprising:
a plurality of transmission gates corresponding to the plurality of first capacitors, wherein the first compute line is coupled to the plurality of first capacitors through the plurality of transmission gates.

Clause 16. The compute-in-memory of clause 15, further comprising a dummy analog-to-digital converter coupled to an output signal of the comparator.

Clause 17. A method of operation for a compute-in-memory, comprising:
charging a first compute line responsive to a first multiply-and-accumulate operation between a first filter weight bit and a first plurality of activation bits for a first plurality of channels;
digitizing a voltage of the first compute line to provide a first digital number;
charging a second compute line responsive to a second multiply-and-accumulate operation between a second filter weight bit and a second plurality of activations bits for a second plurality of channels;
digitizing a voltage of the second compute line to provide a second digital number; and
adding the first digital number and the second digital number to provide a sum.

Clause 18. The method of clause 17, further comprising:
providing a discharged plurality of first capacitors corresponding to the first plurality of activation bits for the first plurality of channels;
for each first capacitor in the discharged plurality of first capacitors, charging the first capacitor responsive to a corresponding activation bit from the first plurality of activation bits and the first filter weight bit both being true to provide a charged plurality of first capacitors; and
coupling the charged plurality of first capacitors to the first compute line prior to the digitizing of the voltage of the first compute line.

Clause 19. The method of any of clauses 17-18, further comprising:
selecting the first plurality of activation bits for the first plurality of channels through a plurality of multiplexers.

Clause 20. The method of clause 19, further comprising:
controlling the plurality of multiplexers to select the first plurality of activation bits responsive to a phase signal from a self-timed replica circuit.

Clause 21. A compute-in-memory, comprising:
a first plurality of arithmetic cells, each arithmetic cell in the first plurality of arithmetic cells including a first capacitor;
a first plurality of switches;
a first compute line coupled to each first capacitor in the first plurality of arithmetic cells through the first plurality of switches; and
a first analog-to-digital converter having an input terminal coupled to the first compute line.

Clause 22. The compute-in-memory of clause 21, further comprising:
a second plurality of arithmetic cells, each arithmetic cell in the second plurality of arithmetic cells including a second capacitor;
a second plurality of switches;
a second compute line coupled to each second capacitor in the second plurality of arithmetic cells through the second plurality of switches; and
a second analog-to-digital converter having an input terminal coupled to the second compute line.

Clause 23. The compute-in-memory of clause 22, further comprising:
a digital adder coupled to an output terminal of the first analog-to-digital converter and to an output terminal of the second analog-to-digital converter.

Clause 24. The compute-in-memory of any of clauses 21-23, wherein the compute-in-memory is integrated into a server.

Clause 25. The compute-in-memory of any of clauses 21-24, further comprising:
a first array of bitcells; and
a first multiplexer configured to select a first filter weight bit from the first array of bitcells to provide a selected first filter weight bit to each arithmetic cell in the first plurality of arithmetic cells.

Clause 26. The compute-in-memory of clause 25, wherein the first plurality of arithmetic cells is configured to multiply the selected first filter weight bit with a first plurality of activation bits from a first plurality of channels.

Clause 27. The compute-in-memory of clause 26, further comprising:
a second array of bitcells; and
a second multiplexer configured to select a second filter weight bit from the second array of bitcells to provide a selected second filter weight bit to each arithmetic cell in the second plurality of arithmetic cells.

Clause 28. The compute-in-memory of clause 27, wherein the second plurality of arithmetic cells is configured to multiply the selected second filter weight bit with a second plurality of activation bits from a second plurality of channels.

Clause 29. The compute-in-memory of clause 26, wherein the first plurality of channels is configured to form a filter of a Convolutional Neural Network or a Deep Neural Network.

Clause 30. The compute-in-memory of clause 26, wherein the first plurality of channels is configured to be a layer of a Convolutional Neural Network or a Deep Neural Network.

Clause 31. The compute-in-memory of clause 28, wherein the first plurality of channels and the second plurality of channels are configured to be a part of a plurality of sub-arrays of a filter or a layer of a convolutional neural network or of a deep neural network.

Clause 32. The compute-in-memory of clause 2/8, wherein a number of channels in the first plurality of channels and in the second plurality of channels are both configurable.

Clause 33. The compute-in-memory of clause 31, wherein a number of sub-arrays in the plurality of sub-arrays is configurable.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

We claim:

1. A compute-in-memory, comprising:
a plurality of first switch pairs corresponding to a plurality of first bits, each first switch pair including a first switch controlled by a corresponding first bit from the plurality of first bits and including a second switch controlled by a second bit;
a plurality of first capacitors corresponding to the plurality of first switch pairs, each first capacitor being coupled in series with a corresponding first switch pair from the plurality of first switch pairs;
a first compute line coupled to the plurality of first capacitors;
a first analog-to-digital converter having an input terminal coupled to the first compute line;
a plurality of third switches corresponding to the plurality of first switch pairs, each first switch pair being coupled to a corresponding first capacitor of the plurality of first capacitors through a respective one of the third switches; and
a self-timed replica circuit including a fourth switch transistor in series with a replica first capacitor, wherein each third switch in the plurality of third switches is a third switch transistor and a gate of the fourth switch transistor is coupled to a gate of each third switch transistor.

2. The compute-in-memory of claim 1, further comprising;
a plurality of second switch pairs corresponding to a plurality of third bits, each second switch pair including a first switch controlled by a corresponding third bit from the plurality of third bits and including a second switch controlled by the second bit;
a plurality of second capacitors corresponding to the plurality of second switch pairs, each second capacitor being coupled in series with a corresponding second switch pair from the plurality of second switch pairs;
a second compute line coupled to the plurality of second capacitors; and
a second analog-to-digital converter having an input terminal coupled to the second compute line.

3. The compute-in-memory of claim 2, wherein the plurality of first bits comprises a plurality of first activation bits, the second bit comprises a filter weight bit, and the plurality of third bits comprises a plurality of second activation bits.

4. The compute-in-memory of claim 1, wherein a capacitance of the replica first capacitor is substantially equal to a capacitance of each first capacitor from the plurality of first capacitors.

5. The compute-in-memory of claim 1, wherein each first switch comprises a first p-type-metal-oxide-semiconductor (PMOS) switch transistor, each second switch comprises a second PMOS switch transistor, and each third switch transistor comprises a third PMOS switch transistor.

6. The compute-in-memory of claim 1, wherein the self-timed replica circuit includes a comparator configured to compare a voltage of the first compute line to a threshold voltage.

7. The compute-in-memory of claim 6, further comprising:
a compute line capacitor coupled to the first compute line, wherein a capacitance of the compute line capacitor is approximately equal to a sum of a capacitance of each first capacitor of the plurality of first capacitors.

8. The compute-in-memory of claim 7, wherein the threshold voltage is approximately one-half of a power supply voltage.

9. The compute-in-memory of claim 6, wherein the self-timed replica circuit is further configured to control a discharge of each first capacitor from the plurality of first capacitors responsive to a detection by the comparator that the voltage of the first compute line is greater than or equal to the threshold voltage.

10. The compute-in-memory of claim 6, further comprising a dummy analog-to-digital converter coupled to an output signal of the comparator.

11. The compute-in-memory of claim 1, further comprising:
   a plurality of bitcells; and
   a first multiplexer configured to select from the plurality of bitcells to provide the second bit to each second switch in the plurality of first switch pairs.

12. The compute-in-memory of claim 11, further comprising:
   a plurality of second multiplexers corresponding to the plurality of first switch pairs; and
   a plurality of register pairs corresponding to the plurality of second multiplexers; wherein each second multiplexer in the plurality of second multiplexers is configured to select the corresponding first bit from a corresponding register pair in the plurality of register pairs.

13. The compute-in-memory of claim 1, further comprising:
   a plurality of transmission gates corresponding to the plurality of first capacitors, wherein the first compute line is coupled to the plurality of first capacitors through the plurality of transmission gates.

14. A compute-in-memory, comprising:
   a plurality of first switch pairs corresponding to a plurality of first bits, each first switch pair including a first switch controlled by a corresponding first bit from the plurality of first bits and including a second switch controlled by a second bit;
   a plurality of first capacitors corresponding to the plurality of first switch pairs, each first capacitor being coupled in series with a corresponding first switch pair from the plurality of first switch pairs;
   a first compute line coupled to the plurality of first capacitors;
   a first analog-to-digital converter having an input terminal coupled to the first compute line;
   a plurality of bitcells;
   a first multiplexer configured to select from the plurality of bitcells to provide the second bit to each second switch in the plurality of first switch pairs;
   a plurality of second multiplexers corresponding to the plurality of first switch pairs; and
   a plurality of register pairs corresponding to the plurality of second multiplexers; wherein each second multiplexer in the plurality of second multiplexers is configured to select the corresponding first bit from a corresponding register pair in the plurality of register pairs,
   wherein each first switch is a PMOS switch transistor and wherein each second multiplexer is an inverting multiplexer.

* * * * *